(12) United States Patent
Saracco

(10) Patent No.: US 8,537,871 B2
(45) Date of Patent: Sep. 17, 2013

(54) FIBER CLADDING LIGHT STRIPPER

(75) Inventor: Matthieu Saracco, Portland, OR (US)

(73) Assignee: nLIGHT Photonics Corporation, Vancouver, WA (US)

( * ) Notice: Subject to any disclaimer, the term of this patent is extended or adjusted under 35 U.S.C. 154(b) by 164 days.

(21) Appl. No.: 13/179,856

(22) Filed: Jul. 11, 2011

(65) Prior Publication Data
US 2013/0016740 A1 Jan. 17, 2013

(51) Int. Cl.
*H01S 3/03* (2006.01)

(52) U.S. Cl.
USPC .................. 372/64; 372/6; 372/30; 372/69

(58) Field of Classification Search
USPC .................................... 372/6, 30, 64
See application file for complete search history.

(56) References Cited

U.S. PATENT DOCUMENTS

| 4,130,343 | A * | 12/1978 | Miller et al. ............... 385/49 |
| 7,373,070 | B2  | 5/2008  | Wetter et al. |
| 7,839,901 | B2  | 11/2010 | Meleshkevich et al. |
| 2002/0097963 | A1 * | 7/2002 | Ukechi et al. ............... 385/50 |
| 2009/0297108 | A1 * | 12/2009 | Ushiwata et al. ............. 385/127 |

OTHER PUBLICATIONS

Alexandre Wetter, Mathieu Faucher and Benoit Sevigny, "High power cladding light strippers", Proc. SPIE, Jan. 21, 2008, 6873, 687327, San Jose, CA.

* cited by examiner

*Primary Examiner* — Dung Nguyen
(74) *Attorney, Agent, or Firm* — Ethan A. McGrath

(57) ABSTRACT

A high power cladding light stripper and high power laser systems using the same are described. A cladding light stripper includes a housing, a section of fiber disposed in relation to the housing wherein a portion of the section of fiber has an exposed cladding region, a plurality of glue regions sequentially arranged adjacent to each other along the section of fiber and covering the exposed cladding region, and wherein at least one glue region between a first glue region and a last glue region of the plurality of glue regions has a refractive index higher or lower than both an adjacent previous glue region and an adjacent subsequent glue region.

11 Claims, 3 Drawing Sheets

FIBER CLADDING LIGHT STRIPPER

BACKGROUND OF THE INVENTION

1. Field of the Invention

The field of the present invention is light stripping. More particularly, the present invention relates to stripping of light propagating through the cladding of an optical fiber.

2. Background

Advances in laser technology have allowed for increasingly high powered systems. These systems include free space lasers, as well as lasers confined to waveguides, such as fiber lasers. Lasers in combination with fiber amplifiers have also allowed for very high peak power utilizing pulsed output. One advantage of high powered systems that utilize fiber is superior beam quality at the system output. Such systems can create beams having $M^2$ values of closer to unity, thereby enabling high precision materials processing, among other applications.

Many high power fiber laser and fiber amplifier systems operate by coupling light from a pump source, such as another laser, into a fiber so as to excite an active core therein, and by spontaneous emission in the core or by directing a seed signal through the active core of the fiber so as to stimulate emission therealong. The seed signal accumulates power from the excited core and becomes amplified. Similar effects can occur with cladding light as power levels increase.

As more pump light is coupled into the fiber and the power output of the system increases, an increasing amount of unwanted residual light is observed in the cladding surrounding the core. Signal light, including highly amplified signal light, can leak out of the core and into the cladding as well. Moreover, as the system increases in power a third source of unwanted light occurs in the form of amplified spontaneous emission (ASE) increases as well. Consequently, as the power of these devices increases so do instabilities. As an approach to manage instabilities, pump strippers have been proposed to couple residual light out of the cladding. Various designs of pump strippers seek to divert higher numerical aperture cladding light out of the cladding using various means.

For example, the article "High power cladding light strippers" by Wetter et al., describes ways to attenuate cladding light. To minimize localized heating caused by stripping too fast with the intention of uniformly stripping light, high index polymers are used with gradually increasing refractive index. Also, different polymers having different indexes can be applied at different locations. In another example, U.S. Pat. No. 7,839,901 to Meleshkevich et al. discloses a cladding light stripper that includes two or more sub-regions of different materials each with a different refractive index. According to one embodiment described therein subsequent downstream regions have a refractive index that is higher than each previous region, and according to another embodiment described therein subsequent downstream regions have a refractive index that is lower than each previous region.

The aforementioned examples describe various ways to attenuate cladding light that unfortunately achieve mixed results and therefore fail to provide useful guidance for the light stripper designer. Thus, a need still remains for an innovation that will promote efforts to achieve a high power laser system utilizing fiber waveguides and cladding light strippers.

SUMMARY OF THE INVENTION

A cladding light stripper is disclosed, as well as high power laser systems using the same, that provide the aforementioned innovation. The cladding light stripper is one that provides a compact and efficient technique for stripping out cladding light while effectively spreading heat load and avoiding local overheating. The stripper removes more light in a shorter length over conventional stripping techniques and does so while removing both low NA light and high NA light.

According to one aspect of the present invention a light stripper basically includes a conductive housing, a section of fiber having a cladding region exposed, and a plurality of glue regions wherein the section of fiber is immersed therein. The section of fiber is disposed relative to the housing for convenient placement of the glue regions as well as the light stripper as a whole. The glue regions are sequentially arranged one to the next along the exposed cladding of the fiber section and can secure the fiber section to the housing. The respective lengths or refractive indexes of each glue region may differ from one to the next. For some glue regions along the arrangement of glue regions the refractive index is larger than both immediately preceding and following glue regions. By configuring the glue regions according to the present invention, superior results in terms of power and reliability can be achieved over prior art configurations. Consequently, high power laser systems can operate more reliably at higher powers and can be contained in smaller and more versatile packages.

According to another aspect of the present invention, adjacent glue regions of a light stripper are arranged one to the next where the first and one or more subsequent odd regions each have the same refractive index $n_1$ and the same effective length and where the second and zero or more subsequent even regions have the same refractive index $n_2$ but increasing length. In another embodiment, a final glue region has a third refractive index $n_3$ and a much longer length than any of the individual preceding regions utilizing refractive indexes $n_1$ or $n_2$. In some embodiments the exposed cladding has a refractive index less than $n_1$, and refractive index $n_1$ is less than $n_2$, while $n_2$ is less than $n_3$.

According to yet another aspect of the present invention, high power laser systems are shown that utilize a light stripper to achieve superior power and reliability capabilities. The laser systems typically include a pump source to provide an active medium with energy. In a fiber amplifier configuration, a seed source generating pulses provides the active medium with a seed pulse for amplification. In a fiber resonator configuration, lasing occurs spontaneously in the medium between reflectors such as fiber bragg gratings. In either the amplifier or the resonator configuration, one or more light strippers are disposed in the system to attenuate unwanted light.

The foregoing and other objects, features, and advantages will become more apparent from the following detailed description, which proceeds with reference to the accompanying figures.

DETAILED DESCRIPTION OF THE INVENTION

Figure 1:
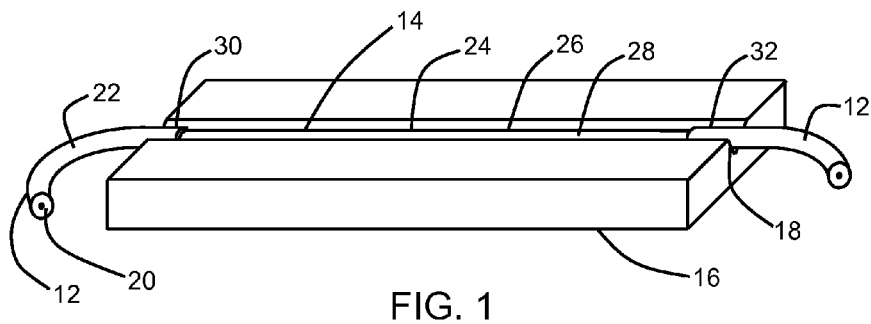
FIG. 1 is a perspective view of an embodiment of the present invention before glue regions are deposited.
Figure 2:
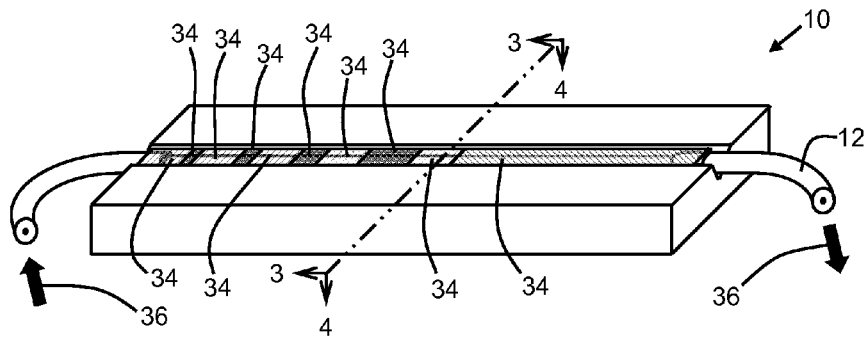
FIG. 2 is a perspective view of an embodiment of the present invention with glue regions deposited.

Reference will now be made to the drawings describing details of the various embodiments of the invention. In FIGS. 1 and 2 an exemplary embodiment is shown of a cladding light stripper device 10. Some aspects of the stripper 10 are shown in FIG. 1, wherein a fiber 12 and a section 14 thereof are disposed in relation to a block 16 of material along a notch 18 formed therein lengthwise of the block 16. The fiber 12 typically has a one or more internal regions 20 as well as an outer region or coating region 22. A middle portion 24 of the fiber section 14 has coating 22 removed so as to expose an exterior surface 26 of an underlying cladding region 28. Opposite end portions 30, 32 of fiber section 14 have coating 22 intact. Additional aspects of stripper 10 are shown in FIG. 2. Several regions 34 of refractive glue materials are disposed on and around the section of fiber section 14. Each region 34 is composed of a glue material having a particular refractive index that is different from an adjacent region 34 of glue material. The glue material may be in the form of a polymer, such as a high index polymer, and preferably in a thermosetting polymer configuration such as with an epoxy. As light propagates through the fiber 12 in the cladding 28 according to general directional arrows 36, the intensity of the propagated light is attenuated by the stripper 10. One or more glue regions 34 perform the additional function of securing the fiber 12 in position for light stripping.

Figure 3:
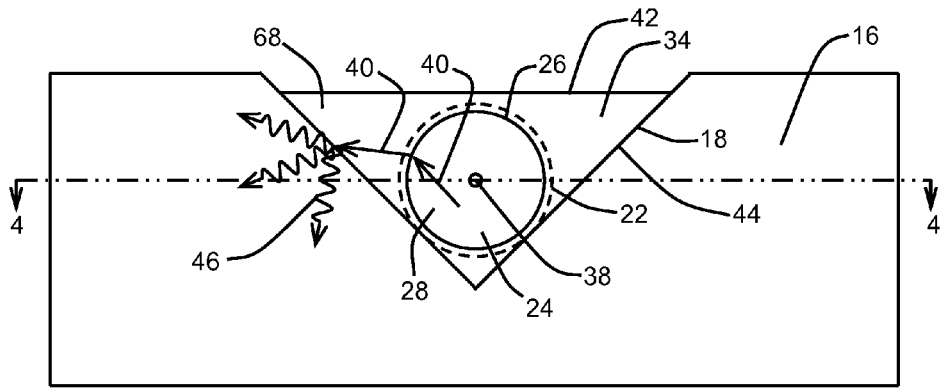
FIG. 3 is a cross-section of the embodiment shown in FIG. 2.
Figure 4:
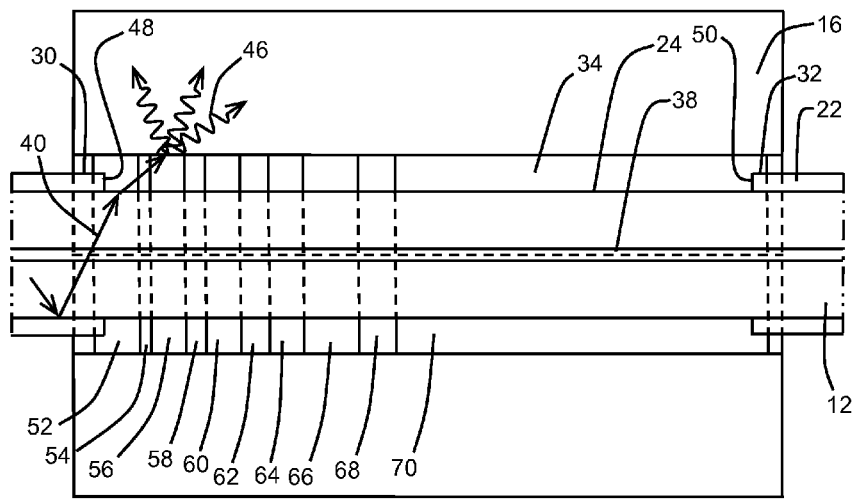
FIG. 4 is another cross-section of the embodiment shown in FIG. 2 cut along the middle of an optical fiber.

More detailed views of an exemplary embodiment are shown in FIGS. 3 and 4. In particular, FIG. 3 shows a cross-section of stripper 10 at an approximate middle lengthwise location of the block 16. Accordingly, a region 34 of glue material surrounds an exterior cladding surface 26 of the middle portion 24 of fiber section 14. The cross-section shows the fiber 12 having internal fiber regions 20 such as cladding region 28 and a core region 38. A coating region 22 of fiber 12, disposed at an end portion 30, while hidden in this sectional view, is also shown. Propagating generally out of the page of FIG. 3 and through the cladding region 28 of fiber 12 are rays of light 40. Rays 40 will generally reflect or refract at region to region interfaces, such as cladding surface 26, and thereby continue to propagate through or exit the fiber waveguide, respectively. Whether a ray 40 reflects or refracts is determined in part by the difference in the refractive index of the material between the adjacent regions. For example, a ray propagating from a region of higher refractive to a region of lower refractive index will bend away from the normal of incidence, and so is more likely to be reflected than refracted, depending on the angle of incidence of the ray. One known method using this concept to direct propagating light out of a waveguide involves embedding a coating-less section of fiber in a bath of transparent or translucent material that has a higher refractive index than the exposed fiber region having no coating.

Effective removal of light at a cladding interface 26 with glue material depends on several factors. One important factor previously mentioned is the difference between the refractive indexes of material on both sides of the interface 26. Another factor is the degree of transparency of the regions 34 of glue material for the wavelength of interest. For example, devices such as a fiber laser or a fiber amplifier may utilize a pump laser contributing light to the cladding at a variety of wavelengths, depending on the application. The transparency can be tuned, and the glue material selected, such that minimal interaction between propagating rays 40 and the glue region 34 (hereinafter for purpose of brevity, "glue region" will be used instead of "region of glue material") is achieved. Since transparency is the degree of transmission of light in the glue medium at a certain wavelength, to promote minimal interaction the transmission is increased as close to 100% as possible given the constraints of the glue material used. In such a configuration, overheating is less likely to occur. However, various limitations, including the targeted or desired refractive index of the glue, can factor into the maximum achievable transparency. The refractive index of the glue material for the wavelength of interest is determined by the glue material used, so that a particular desired refractive index operating under a particular heat load and temperature range can be obtained by selecting or mixing glue materials appropriately for a particular application.

The transparency can also be tuned, and the glue material selected, such that some amount of interaction is intended or allowed between the propagating rays 40 and the glue region 34. For example, a transmission percentage would be adjusted to a lower target than the maximum allowed by the various limitations of the glue material, and thereby an increased absorption of light by the glue material would occur. Any amount of interaction between the glue material and propagating rays 40 may cause localized heating of the glue (hereinafter for purpose of brevity, "glue" will be used instead of "glue material"). Consequently, the glues must be able to withstand high temperature while the stripper 10 operates at a temperature below the thermogravimetric degradation temperature. If the glue heats up past a normal operating range, detrimental effects may occur such as an unacceptable change in refractive index, or a state change of the material or a change in viscosity. Such heating may also be beneficial as a way to convert stripped light to heat, or to prevent rays from reflecting back into the waveguide. Also, a change in refractive index could be advantageous if it occurs in a predictable way. For example, as the temperature increases the refractive index increases ($\Delta n/\Delta T > 0$) which can thereby enhance light stripping effects as the energy load on the stripper 10 increases. Generally it is preferable that the glues be transparent at the wavelengths of any laser system signal or pump sources.

As shown in the FIG. 3 cross-section, as light rays 40 are diverted out of the fiber section 24 the light is either directed out of a top surface 42 or rays 40 impinge on a notched surface 44 of block 16. Some rays will be absorbed by the glue material or by surface 44 and cause heat, shown symbolically as heat rays 46, to diffuse into block 16. To provide effective heat dissipation of the stripped rays 40, block 16 is preferably made from a heat conductive material, such as aluminum or copper. Other materials may be used depending on various parameters or requirements of the apparatus in which the stripper 10 is disposed as well as the types of glue material used for light stripping. Moreover, while block 16 may be secured to a housing of a laser system through fasteners or other means, block 16 can also instead be part of the housing itself.

In FIG. 4 another cross-section of the stripper 10 shows a lower section thereof through a mid-plane of the optical fiber 12. In better detail, middle portion 24 and opposite end portions 30, 32 of fiber section 14 are shown. Because the coating region 22 of the middle portion 24 is substantially removed from the fiber section 14, opposite end coating surfaces 48, 50 are present at the internal ends of respective opposite end portions 30, 32. A first glue region 52 of a plurality of glue regions 34 is made of material having a first refractive index $n_1$ and is disposed so as to overlap opposite end coating surface 48 of end portion 30. First glue region 52 extends laterally a first glue region distance from end coating surface 48 and along the fiber section 14. The refractive index $n_1$ is larger than the refractive index of the coating portion 22 of the fiber 12. Consequently, some of rays 40 propagating or internally reflecting through fiber 12 will refract out of the middle fiber section 24 and impinge or interact with block 16 and diffuse some light energy in the form of heat therein.

A second glue region 54 made of material with a second refractive index $n_2$ is adjacent to and in contact with first glue region 52 and extends laterally from the end of the first glue region 52 a second glue region distance along the fiber section 14. The second glue region distance may be different from the first glue region distance, and for many applications is shorter than the first glue region distance, as shown in FIG. 4. The second refractive index $n_2$ is larger than the first refractive index $n_1$, and consequently some rays 40 having a smaller numerical aperture will be refracted out of middle fiber section 24 into second glue region 54 that would otherwise not depart middle section 24 in first glue region 52.

A third glue region 56 is adjacent to and in contact with second glue region 54 and extends laterally from the end of second glue region 54 a third glue region distance along fiber section 14. The material of third glue region 56 may be the same as first glue region 52 and consequently a refractive index associated with third glue region 56 may be the same as $n_1$ of first glue region 52. In other embodiments, refractive index of third glue region 56 is different from $n_1$ of first glue region 52 but still smaller than $n_2$ of second glue region 54. The third glue region distance of third glue region 56 may be the same as the first glue region distance of first glue region 52, particularly if the materials and refractive indexes are the same.

Also shown in FIG. 4 are several additional and subsequently adjacent glue regions 34. A fourth glue region 58 adjacent to and in contact with third glue region 56 has a refractive index that in some embodiments is the same as $n_2$. Also, fourth glue region 58 extends laterally from the end of third glue region 56 a fourth glue region distance along fiber section 14. In some embodiments, the fourth glue region distance may be larger than the second glue region distance by some predetermined amount or factor, for example, twice as large. A fifth glue region 60 adjacent to and in contact with fourth glue region 58 extends laterally from the end of fourth glue region 58 a fifth glue region distance along fiber section 14. The fifth glue region distance may be the same as the first and third glue region distances, or in other embodiments the distances may be different from each other. Similarly, in some embodiments the fifth glue region refractive index may be the same as $n_1$.

In some embodiments sequentially adjacent glue regions follow a similar pattern. A sixth glue region 62 extends laterally from the fifth glue region 60 a sixth glue region distance. The refractive index of sixth glue region 62 is preferably $n_2$, or it may be different, but is larger than $n_1$. A seventh glue region 64 extends laterally from sixth glue region 62 a seventh glue region distance. The refractive index of seventh glue region 64 is preferably $n_1$, or it may be different, but is smaller than $n_2$. An eighth glue region 66 extends laterally from seventh glue region 64 an eighth glue region distance. The index of eighth region 66 is preferably $n_2$, or it may be different, but is larger than $n_1$. A ninth glue region 68 with index $n_9$ extends laterally from eighth glue region 66 a ninth glue region distance. The index of ninth region 68 is preferably $n_1$, or it may be different, but is larger than $n_2$. A tenth region 70 is adjacent to and in contact with ninth region 68 and extends laterally a tenth region distance. Tenth region 70 has a third refractive index $n_3$ that is larger than both previous indexes $n_1$ and $n_2$.

Figure 5:
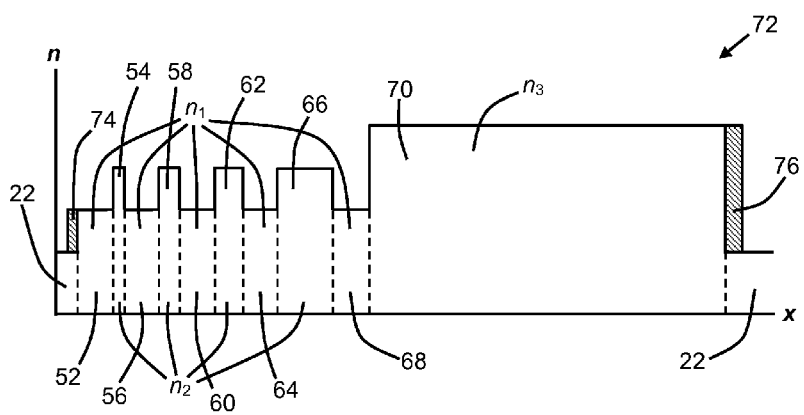
FIG. 5 is a refractive index profile according to the embodiment shown in FIG. 4.

Referring to FIG. 5, a refractive index profile 72 is shown depicting the index as a function of length x along fiber section 14. The profile 72 has ten glue regions 34 wherein each region has a refractive index associated with it that is one of $n_1$, $n_2$, or $n_3$, as described above. At each end of the profile 72 are coating regions 22 corresponding to opposite end portions 30, 32 where the coating 22 is not removed from the fiber 12. Because some glue covers the coating 22 in these areas, overlapping regions 74, 76 are created at each end. Overlapping regions 74, 76 generally do not contribute to light stripping efficacy, however some amount of overlap protects exposed cladding 28 from damage or excessive light stripping. While pure air generally has a suitably low refractive index to induce internal reflection of propagating light waves, contaminants can deposit or interact locally with cladding 28 to produce index variations at the surface thereof that can lead to catastrophic optical damage of the fiber 12.

As described before and as can be seen from FIGS. 2, 4 and 5, sequentially arranged glue regions 34 form different patterns or profiles when disposed along the fiber section 14 on the block 16. One such pattern is alternating small index and large index regions, such as regions 52, 54, and 56, in a tooth-like arrangement. By alternating refractive index regions, amounts of low NA light may be removed periodically so as to more evenly distribute heat dissipation across the stripper 10, and hot spots or premature failure can be avoided. For example, for a laser system operating at a high power, in first glue region 52 some amount of large NA light is stripped out of the fiber section 14 causing a local temperature increase in proximate glue regions, such as region 54, and block 16. In second glue region 54 having a higher refractive index $n_2$, some amount of both higher NA light and low NA light is removed from the cladding 28. Since second glue region 54 has a predetermined glue region length, in FIG. 5 much shorter than first glue region 52, the abrupt increase in light removal associated with the higher refractive index $n_2$ does not cause a severe local temperature increase to the fiber section 14, the glue regions 34, or the block 16. For laser systems producing much less power in lower NA light in the cladding 28, the length of second glue region 54 may be correspondingly longer. However, for most laser systems, the first exposure of propagating light to a glue region 34 having a higher refractive index, e.g., $n_2$ or $n_3$, will result in a significant amount of light stripped from fiber section 14. In some embodiments, a glue region 34 having a higher refractive index may be disposed first along fiber section 14, and can consequently allow for a similar but shifted tooth-like refractive index profile of glue sections 34.

According to the alternating small index and large index region pattern described above, subsequent odd region 56 provides another lower index material further stripping higher NA light from the cladding 28. As shown, region 56 and subsequent odd regions have the equal glue region lengths along the direction of propagation. Also as shown, subsequent even glue region 58 has a longer glue region length than the length of previous even glue region 54. Likewise, subsequent higher index even glue regions have gradually increasing lengths along the direction of propagation according to acceptable non-damaging heat transfer of the attenuating residual cladding light into glue regions 34 and block 16. Once a suitable amount of light energy has been stripped and diverted from the fiber section 14, a glue region 34 having a higher index $n_3$, such as glue region 70, can be safely disposed along fiber section 14 to strip remaining residual light including light having a lower NA.

Figure 6:
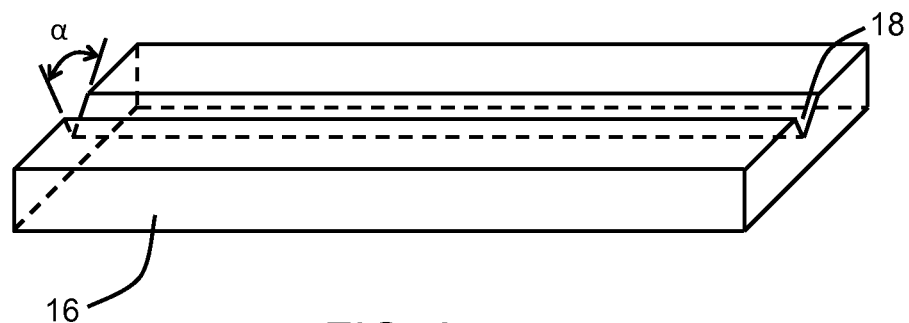
FIG. 6 is a perspective view of an exemplary housing of the present invention.

Various mounting arrangements are possible for stripper 10. In FIG. 6 a more detailed view is shown of conductive block 16 according to one mounting arrangement of the present invention. Block 16 is made of highly conductive aluminum and is approximately 15 cm long by 5 cm wide by 1 cm thick. A notch 18 is machined into block 16 along an approximate midpoint of the width and extending across the length. The block 16 is attached to a housing of the laser apparatus (not shown) in which the stripper 10 is disposed. Notch 18 is cut at a suitable angle α, such as approximately 90°. Other angles may be used, as well as other geometries. For example, a square or semi-circular notch may be used instead. In any case, the notch 18 or other geometry should have a cross-section of suitable size to accommodate fiber 12 and amounts of glue being disposed therein. Also, as described above, it may be suitable to provide the conductive block 16 as part of the housing of the laser system. A notch 18 may be machined into the housing and other aspects of the stripper 10 may be installed accordingly.

Figure 7:
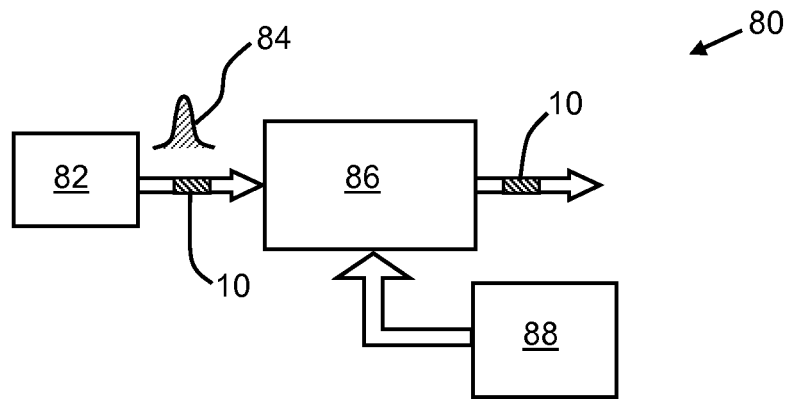
FIG. 7 is a diagram of an exemplary fiber amplifier laser system of the present invention.
Figure 8:
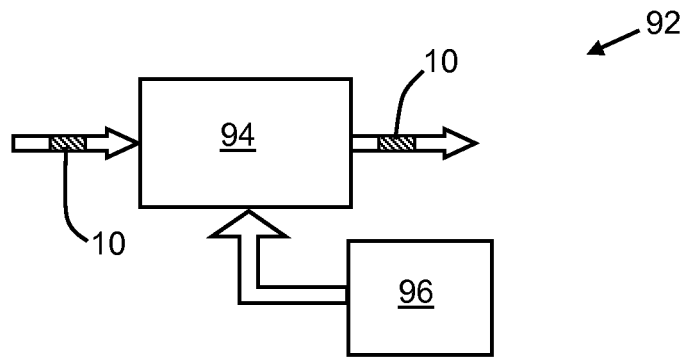
FIG. 8 is a diagram of an exemplary fiber resonator laser system of the present invention.

Stripper 10 is particularly suited for use in connection with high power laser systems. Referring to FIG. 7, one example of such a system may be a fiber amplifier laser system 80 which may include a seed source 82 providing pulses 84 of light, or alternatively a continuous stream of light, at a wavelength to an active fiber core 86. A pump source 88 provides pulsed or continuous light energy at a second wavelength shorter than the seed source wavelength to the active fiber core as well and excites the active elements therein to suitably high energy levels. Light from the seed source is amplified as it propagates through and past the active ions of the fiber towards an output 90. Before or after (or both) the active fiber 86, the passive stripper 10 may be disposed to attenuate residual light in the cladding of the fiber that could otherwise cause optical damage to laser components throughout the system, including the active fiber 86, seed source 82, or pump source 88. Referring to FIG. 8, another example of such a system may be a fiber resonator laser system 92 which can include an active fiber resonator 94 disposed between distributed bragg reflectors, such as fiber bragg gratings, and a pump source 96 that similarly excites the active medium therein with pump light energy. The stripper 10 may be disposed in line before or after the fiber resonator 94 to attenuate unwanted residual light. For example, for an end pumped resonator, a stripper 10 may be disposed after the active fiber 94. Furthermore, amplifier systems 80 and resonator systems 92 can be used in combination, in which case fiber strippers 10 may be disposed before, after, or between relevant component and system connections such that undesirable light is attenuated.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments.

What is claimed is:

1. A cladding light stripper, comprising:
   a housing;
   a section of fiber disposed in relation to said housing, wherein a portion of said section of fiber has an exposed cladding region; and
   a plurality of glue regions sequentially arranged adjacent to each other along said section of fiber and covering said exposed cladding region;
   wherein at least one glue region between a first glue region and a last glue region of said plurality of glue regions has a refractive index either higher or lower than both an adjacent previous glue region and an adjacent subsequent glue region.

2. The cladding light stripper of claim 1, wherein said first glue region surrounds both said exposed cladding region and a coated region of said section of fiber.

3. The cladding light stripper of claim 1, wherein said first glue region of said plurality of glue regions has a first refractive index larger than said exposed cladding region, a second glue region of said plurality of glue regions has a second refractive index larger than said first refractive index, and a third glue region of said plurality of glue regions has a third refractive index smaller than said second refractive index.

4. The cladding light stripper of claim 1, wherein said last glue region of said plurality of glue regions has a refractive index larger than each previous glue region.

5. The cladding light stripper of claim 1, wherein a first set of said plurality of glue regions has an alternating low index and high index profile.

6. The cladding light stripper of claim 5, wherein said glue regions with a low index have lengths that are approximately equal, and said glue regions with a high index have lengths that gradually increase.

7. The cladding light stripper of claim 6, wherein said alternating low index and high index profile includes five low index glue regions and four high index glue regions.

8. The cladding light stripper of claim 6, wherein said alternating low index and high index profile includes five high index glue regions and four low index glue regions.

9. The cladding light stripper of claim 6, wherein said alternating low index and high index profile includes four low index glue regions and three high index glue regions.

10. The cladding light stripper of claim 6, wherein said alternating low index and high index profile includes six low index glue regions and five high index glue regions.

11. The cladding light stripper of claim 7, wherein said plurality of glue regions includes a tenth region having an index higher than indexes of each previous glue region.

* * * * *